United States Patent
Ishibashi

(10) Patent No.: US 8,749,202 B2
(45) Date of Patent: Jun. 10, 2014

(54) BATTERY CONTROL SYSTEM, BATTERY CONTROLLER, BATTERY CONTROL METHOD AND PROGRAM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 12/944,256

(22) Filed: Nov. 11, 2010

(65) Prior Publication Data

US 2011/0133688 A1 Jun. 9, 2011

(30) Foreign Application Priority Data

Dec. 9, 2009 (JP) ................................. 2009-279820

(51) Int. Cl.
*H02J 7/00* (2006.01)
(52) U.S. Cl.
USPC ............................ 320/132; 320/101; 320/103
(58) Field of Classification Search
USPC ......................................... 320/101, 103, 132
See application file for complete search history.

(56) References Cited

U.S. PATENT DOCUMENTS

| | | | | |
|---|---|---|---|---|
| 5,982,139 | A * | 11/1999 | Parise | 320/109 |
| 7,304,454 | B2 * | 12/2007 | Inui et al. | 320/155 |
| 7,863,775 | B2 * | 1/2011 | Oh | 307/66 |
| 2008/0179887 | A1 * | 7/2008 | Kawazoe et al. | 290/44 |

FOREIGN PATENT DOCUMENTS

| | | | | |
|---|---|---|---|---|
| JP | 2000125407 A | * | 4/2000 | ............... B60L 8/00 |
| JP | 2002-135980 | | 5/2002 | |
| JP | 2003-189477 A | | 7/2003 | |
| JP | 2006-285728 | | 10/2006 | |
| JP | 2007-151371 A | | 6/2007 | |
| JP | 2008-54439 A | | 3/2008 | |
| JP | 2008-141918 A | | 6/2008 | |

OTHER PUBLICATIONS

Translation and abastract for JP 2005/125407 A.*
Office Action issued Oct. 22, 2013, in Japanese Patent Application No. 2009-279820.

* cited by examiner

*Primary Examiner* — Samuel Berhanu
(74) *Attorney, Agent, or Firm* — Oblon, Spivak, McClelland, Maier & Neustadt, L.L.P.

(57) ABSTRACT

Provided is a battery control system including a power generation unit that generates electric power from renewable energy as an energy source, a battery storing the electric power, a power generation amount estimation unit that estimates a generation amount of electric power generated by the power generation unit, based on estimation information in which a renewable energy amount available to the power generation unit is estimated, a power consumption amount estimation unit that estimates power consumption, a determination unit that determinates whether or not electric power is to be stored in the battery, based on a storage amount of the battery, the generation amount of electric power and the amount of power consumption, and a power acquisition unit that acquires electric power to be stored in the battery, when, as a result of determination by the determination unit, electric power is to be stored in the battery.

16 Claims, 9 Drawing Sheets

BATTERY CONTROL SYSTEM, BATTERY CONTROLLER, BATTERY CONTROL METHOD AND PROGRAM

BACKGROUND OF THE INVENTION

1. Field of the Invention

The present invention relates to a battery control system, a battery controller, a battery control method and a program.

2. Description of the Related Art

In recent years, efforts to drastically reduce greenhouse gases are underway in all parts of the world. Under such a circumstance, it is necessary to introduce renewable energy such as wind power and sunlight on a large scale.

Nowadays, in order to generate electric power from renewable energy as an energy source, introduction of a photovoltaic power generation panel to a residential building or the like, that is, introduction of a photovoltaic power generation panel to a household is being made in Japan. And in case of a household in which a photovoltaic power generation panel has been introduced, electric power generated by the photovoltaic power generation panel has been used in the household, or surplus electric power has been sold to an electric power company.

However, it gradually becomes difficult for an electric power company to purchase electric power, because the electric power company can not grasp an amount of electric power generated at each household, because the number of the household that wishes to sell electric power is increasing, because an electric power supplying system gets unstable, and so on.

If an electric power company does not purchase electric power, surplus electric power in each household will be wasted. Alternatively, surplus electric power will be stored and used. When surplus electric power is stored in each household, a battery for storing electric power is to be introduced to each household. Further, when an electric power company wishes to purchase electric power not immediately but later, a battery is to be introduced to each household in order to store electric power generated by a photovoltaic power generation panel. Moreover, when each household possesses an electric vehicle or the like, a battery such as a lithium-ion battery, which is used in an electric vehicle or the like, may be introduced.

Against this background, a system is proposed which is capable of performing centralized control of an amount of electric power generated by an independent power supply device utilizing multiple natural energy sources, as a carbon dioxide reduction amount and promoting the prevention of global warming (Kyoto Protocol) (see JP-A-2006-285728, for example). Further, a power supply system is proposed which constantly supplies safe, earth-friendly and enough electric power by use of a fuel cell that utilizes photovoltaic power generation and hydrogen (see JP-A-2002-135980, for example).

SUMMARY OF THE INVENTION

Incidentally, when a battery is introduced in a residential building or the like, namely, when a battery is introduced in a household, the battery needs to be efficiently controlled in each household. For example, it is necessary to efficiently control how electric power stored in the battery is to be used, at which timing electric power stored in the battery is to be sold to an electric power company, at which timing electric power stored in the battery is to be bought from an electric power company, whether electric power is to be generated, and so on.

At present, as control for a battery introduced in a residential building or the like, only display of current storage state of a battery and display of carbon dioxide emissions on a display panel is performed.

In light of the foregoing, it is desirable to provide a battery control system, a battery controller, a battery control method and a program which are novel and improved, and which are capable of efficiently controlling a battery introduced in a residential building or the like.

According to an embodiment of the present invention, there is provided a battery control system including a power generation unit that generates electric power from renewable energy as an energy source, a battery for storing the electric power, a power generation amount estimation unit that estimates a generation amount of electric power generated by the power generation unit, based on estimation information in which a renewable energy amount available to the power generation unit is estimated, a power consumption amount estimation unit that estimates an amount of electric power consumption, a determination unit that determinates whether or not electric power is to be stored in the battery, based on a storage amount of the battery, the generation amount of electric power and the amount of power consumption, and a power acquisition unit that acquires electric power to be stored in the battery, when, as a result of determination by the determination unit, electric power is to be stored in the battery.

The battery control system may further include a storage amount information acquisition unit that acquires storage amount information of the battery from the battery, and an estimation information acquisition unit that acquires the estimation information from the outside.

The power consumption amount estimation unit may estimate an amount of electric power consumption based on an amount of electric power consumption in the past.

The power consumption amount estimation unit may estimate an amount of electric power consumption based on at least one of input information and schedule information, which have been input by a user.

The power acquisition unit may purchase electric power to be stored in the battery.

The power acquisition unit may generate electric power to be stored in the battery by a generator.

The power generation unit may generate electric power from sunlight energy as an energy source.

The power generation unit may generate electric power from wind power as an energy source.

The battery may be a battery mounted on an electric vehicle.

According to another embodiment of the present invention, there is provided a battery controller including a power generation amount estimation unit that estimates a generation amount of electric power generated by a power generation unit, based on estimation information in which an available renewable energy amount is estimated, a power consumption amount estimation unit that estimates an amount of electric power consumption, a determination unit that determinates based on a storage amount of a battery for storing the electric power, the generation amount of electric power and the amount of electric power consumption, whether or not electric power is to be stored in the battery, and a power acquisition unit that acquires electric power to be stored in the battery, when, as a result of determination by the determination unit, electric power is to be stored in the battery.

According to another embodiment of the present invention, there is provided a battery control method, including the steps of estimating a generation amount of electric power generated by a power generation unit, based on estimation information in which an available renewable energy amount is estimated, estimating an amount of electric power consumption, determining whether or not electric power is to be stored in a battery, based on a storage amount of the battery, the generation amount of electric power and the amount of electric power consumption, and acquiring electric power to be stored in the battery, when, as a result of determination at the step of determining, electric power is to be stored in the battery.

According to another embodiment of the present invention, there is provided a program for causing a computer to function as a power generation amount estimation unit that estimates a generation amount of electric power generated by a power generation unit, based on estimation information in which an available renewable energy amount is estimated, a power consumption amount estimation unit that estimates an amount of electric power consumption, a determination unit that determinates based on a storage amount of a battery for storing the electric power, the generation amount of electric power and the amount of electric power consumption, whether or not electric power is to be stored in the battery, and a power acquisition unit that acquires electric power to be stored in the battery, when, as a result of determination by the determination unit, electric power is to be stored in the battery.

According to another embodiment of the present invention, there is provided a battery control system including a power generation unit that generates electric power from renewable energy as an energy source, a battery for storing the electric power, an acquisition unit that acquires information about a generation amount of electric power generated by the power generation unit, the generation amount of electric power being estimated based on estimation information in which a renewable energy amount available to the power generation unit is estimated, a power consumption amount estimation unit that estimates an amount of electric power consumption, a determination unit that determinates based on a storage amount of the battery, the information about a generation amount of electric power, and the amount of electric power consumption, whether or not electric power is to be stored in the battery, and a power acquisition unit that acquires electric power to be stored in the battery, when, as a result of determination by the determination unit, electric power is to be stored in the battery.

According to another embodiment of the present invention, there is provided a battery controller including an acquisition unit that acquires information about a generation amount of electric power generated by a power generation unit, the generation amount of electric power being estimated based on estimation information in which an available renewable energy amount is estimated, a power consumption amount estimation unit that estimates an amount of electric power consumption, a determination unit that determinates based on a storage amount of a battery for storing the electric power, the information about a generation amount of electric power, and the amount of electric power consumption, whether or not electric power is to be stored in the battery, and a power acquisition unit that acquires electric power to be stored in the battery, when, as a result of determination by the determination unit, electric power is to be stored in the battery.

According to another embodiment of the present invention, there is provided a battery control method, including the steps of acquiring information about a generation amount of electric power generated by a power generation unit, the generation amount of electric power being estimated based on estimation information in which an available renewable energy amount is estimated, estimating an amount of electric power consumption, determining based on a storage amount of a battery, the information about a generation amount of electric power, and the amount of electric power consumption, whether or not electric power is to be stored in the battery, and acquiring electric power to be stored in the battery, when, as a result of determination by the determination unit, electric power is to be stored in the battery.

According to another embodiment of the present invention, there is provided a program for causing a computer to function as an acquisition unit that acquires information about a generation amount of electric power generated by a power generation unit, the generation amount of electric power being estimated based on estimation information in which an available renewable energy amount is estimated, a power consumption amount estimation unit that estimates an amount of electric power consumption, a determination unit that determinates based on a storage amount of a battery for storing the electric power, the information about a generation amount of electric power, and the amount of electric power consumption, whether or not electric power is to be stored in the battery, and a power acquisition unit that acquires electric power to be stored in the battery, when, as a result of determination by the determination unit, electric power is to be stored in the battery.

According to the embodiments of the present invention described above, it is possible to efficiently control a battery introduced in a residential building or the like.

BRIEF DESCRIPTION OF THE DRAWINGS

FIG. 7 is an explanatory diagram illustrating an example of an input screen displayed on a display unit of a PC, a mobile phone, or the like;

FIG. 8 is an explanatory diagram illustrating an example of an input screen displayed on a display unit of a PC, a mobile phone, or the like.

DETAILED DESCRIPTION OF THE EMBODIMENT(S)

Figure 1:
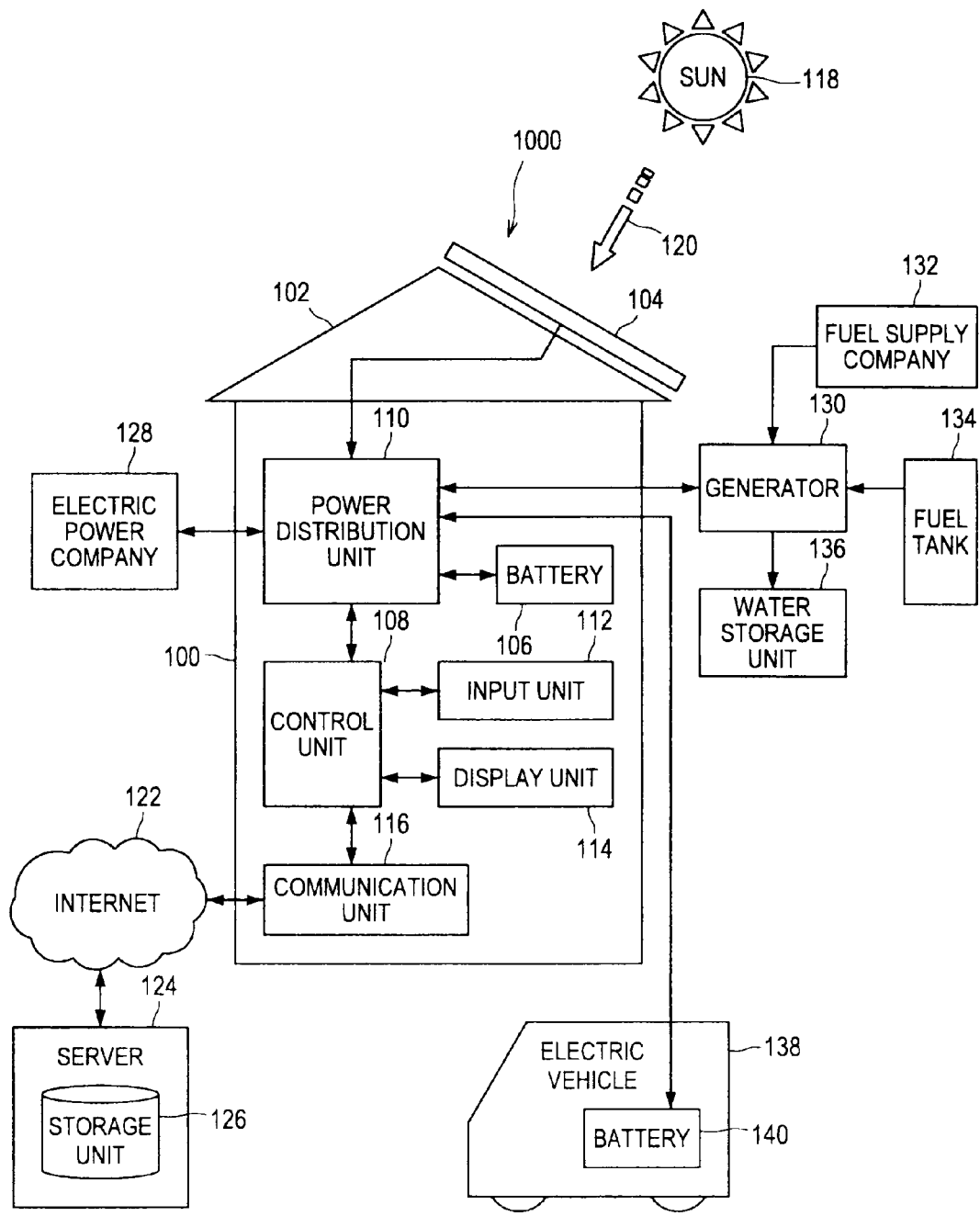
FIG. 1 is an explanatory diagram mainly illustrating a general configuration of a battery control system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
1. Battery control system
2. Functional configuration of control unit
3. First battery control processing
4. Second battery control processing

[1. Battery Control System]

First, a battery control system according to an embodiment of the present invention. FIG. 1 is an explanatory diagram mainly illustrating a general configuration of a battery control system according to an embodiment of the present invention.

In FIG. 1, a battery control system 1000 includes a photovoltaic power generation panel 104, which is installed on a roof 102 of a residential building 100, a battery 106, which is placed inside of a residential building 100, a control unit 108, a power distribution unit 110, an input unit 112, a display unit 114 and a communication unit 116. Besides, the battery 106, the control unit 108, the power distribution unit 110, the input unit 112, the display 114 and the communication unit 116 may be placed outside of the residential building 100.

The photovoltaic power generation panel 104 is an example of the power generation unit of the present invention, and generates electric power by receiving sunlight 120 from the sun 118. Namely, the photovoltaic power generation panel 104 generates electric power from renewable energy as an energy source. The power distribution unit 110 distributes electric power. Besides, the power distribution unit 110 may be divided into two units, that is, a direct-current power distribution unit and an alternating-current power distribution unit. The battery 106 stores electric power. Electric power generated by the photovoltaic power generation panel 104 is stored in the battery 106 via the power distribution unit 110. Moreover, Electric power generated by the photovoltaic power generation panel 104 may be directly stored in the battery 106.

The control unit 108 controls the power distribution unit 110, the input unit 112, the display unit 114 and the communication unit 116. The input unit 112 receives an operation input by a user such as a resident of the building 100. The display unit 114 displays various information to a user. Besides, the input unit 112 and the display unit 114 may be formed in an integrated manner and it may be, for example, a touch panel. The communication unit 116 controls communication with the outside.

The control unit 108 can communicate via the communication unit 116 with a server (cloud server) 124 connected to the Internet 122, the server 124 including a storage unit 128. Further, the control unit 108 can purchase electric power from an electric power company 128 via the power distribution unit 110. The control unit 108 can store electric power, purchased from the electric power company 128, in the battery 106 via the power distribution unit 110. The control unit 108 can sell electric power stored in the battery 106 to the electric power company 128 via the power distribution unit 110. Furthermore, the control unit 108 can cause a generator 130 to generate electric power, by controlling the generator 130 via the power distribution unit 110.

The generator 130 generates electric power using natural gas or hydrogen supplied from a fuel supply company 132 such as a gas company. Further, the generator 130 may generate electric power using kerosene, propane gas, liquid nitrogen, high-compressed hydrogen, or the like, which is stored in a fuel tank 134. Furthermore, the generator 130 may generate hot water from cold water using heat generated at the generation of electric power, and may store the hot water in a water storage unit 136.

Besides, in the present embodiment, the battery control system 1000 includes the battery 106 placed inside of the building 100. However, the battery control system 1000 may use, instead of the battery 106, a battery 140 of an electric vehicle 138. It should be understood that, in the explanation hereafter, the battery 106 may also include the battery 140 appropriately. Moreover, in this example, the battery 106 is explained simply as a battery, but what is meant by a battery in a broad sense is every device or system that is capable of storing electric energy in some way and outputting the electric energy on demand. Detailed examples include a currently available storage battery represented by a lithium-ion battery, a nickel hydride battery, a lead storage battery and a NAS battery, a storage battery that would become available in the future, a high-capacitance capacitor represented by a electric double layer capacitor, a transformation system for electric energy and potential energy of water, represented by pumped storage power generation (bringing up water to high altitude by electric energy corresponds to charge of electricity, and guiding water to low altitude and generating electric power by rotating a turbine with water flow corresponds to discharge of electricity), a mutual transformation system between electric power and hydrogen, which is suggested in a hydrogen-recycling-based society (electrolysis of water by electric energy corresponds to charge of electricity, and generating electric power by rotating a turbine while burning hydrogen, or generating electric power using a fuel cell corresponds to discharge of electricity).

[2. Functional Configuration of Control Unit]

Figure 2:
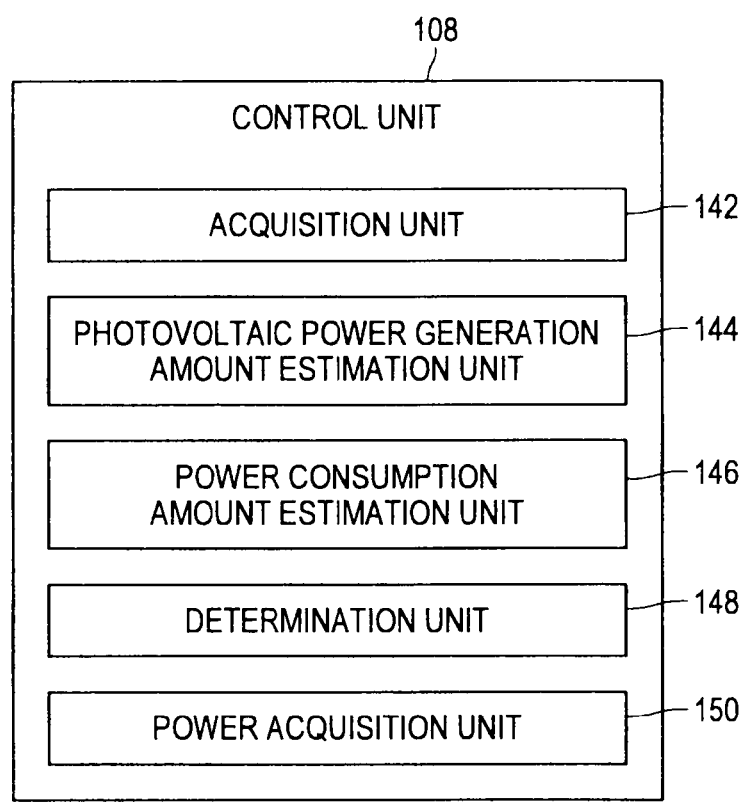
FIG. 2 is a block diagram illustrating a functional configuration of a control unit of the battery control system in FIG. 1.

Next, the control unit 108 of the battery control system 1000 in FIG. 1 will be explained. FIG. 2 is a block diagram illustrating a functional configuration of the control unit 108 of the battery control system 1000 in FIG. 1.

In FIG. 2, the control unit 108 includes an acquisition unit 142, a photovoltaic power generation amount estimation unit 144, a power consumption amount estimation unit 146, a determination unit 148 and a power acquisition unit 150.

The acquisition unit 142 acquires storage amount information indicating a current storage amount of the battery 106 from the battery 106. The acquisition unit 142 acquires via the communication unit 116 sunshine duration estimation information indicating estimated solar irradiation duration of daytime, from the storage unit 126 of the server 124 connected to the internet 122. The acquisition unit 142 acquires user input information which is generated by an operation input of a user via the input unit 112. The acquisition unit 142 acquires via the communication unit 116 schedule information which is input by a user by use of a PC (Personal Computer), a mobile phone, or the like (not shown), from the storage unit 126 of the server 124 connected to the internet 122.

The photovoltaic power generation estimation unit 144 estimates a photovoltaic power generation amount of the photovoltaic power generation panel 104, based on sunshine duration estimation information acquired by the acquisition unit 142. The power consumption amount estimation unit 146 estimates an amount of electric power consumption, based on an operation input of a user via the input unit 112, namely, an operation input which is made by a user each time, and on information about an amount of electric power consumption in the past, stored in a storage unit (not shown) of the battery control system 1000. Moreover, the power consumption amount estimation unit 146 may estimate an amount of electric power consumption, based on user information acquired by the acquisition unit 142, namely, user input information as well as schedule information that have been previously input by a user, and on information about an amount of electric power consumption in the past, stored in a storage unit (not shown) of the battery control system 1000. Further, the above sunshine duration estimation information may be information indicating "how many hours a solar panel is irradiated". Alternatively, the above sunshine duration estimation information may be accumulated irradiation amount information indicating how intense light irradiates a solar panel during a predetermined time period. Furthermore, an accumulated irradiation amount may be divided by a reference irradiation amount so as to be re-converted into the irradiation duration. Furthermore, it may be that, by causing a user to input a power generation efficiency value of a solar panel or causing the acquisition unit 142 to automatically send the value to the server 124, the server 124 calculates to an expected power generation amount and feeds back to the acquisition unit 142. In this case, the photovoltaic power generation amount estimation unit will not be necessary.

The determination unit 148 determines whether or not an amount of electric power to be stored to the battery 106 should be increased, by comparing an amount that is obtained by adding the storage amount indicated by the storage amount information of the battery 106, which is acquired by the acquisition unit 142, and the photovoltaic power generation amount of the photovoltaic power generation panel 104, which is estimated by the photovoltaic power generation amount estimation unit 144, with the amount of electric power consumption estimated by the power consumption amount estimation unit 146. When it is determined, as a result of determination by the determination unit 148, that a storage amount is to be increased, the power acquisition unit 150 purchases electric power from the electric power company 128 via the power distribution unit 110, and/or, causes the generator 130 to generate electric power, via the power distribution unit 110 so as to store purchased electric power or generated electric power in the battery 106.

[3. First Battery Control Processing]

Figure 3:
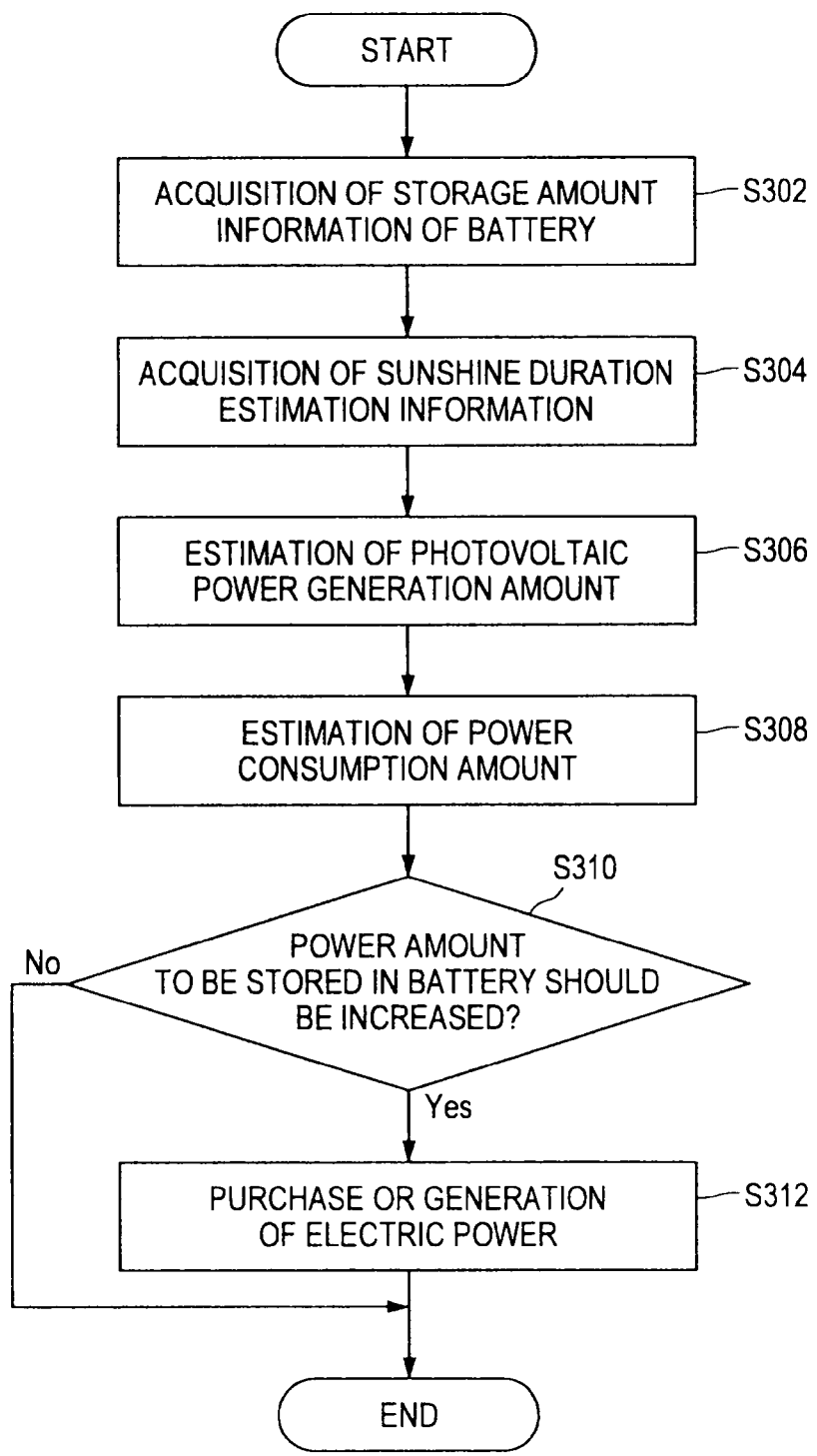
FIG. 3 is a flow chart of first battery control processing that is performed by the battery control system in FIG. 1.
Figure 4:
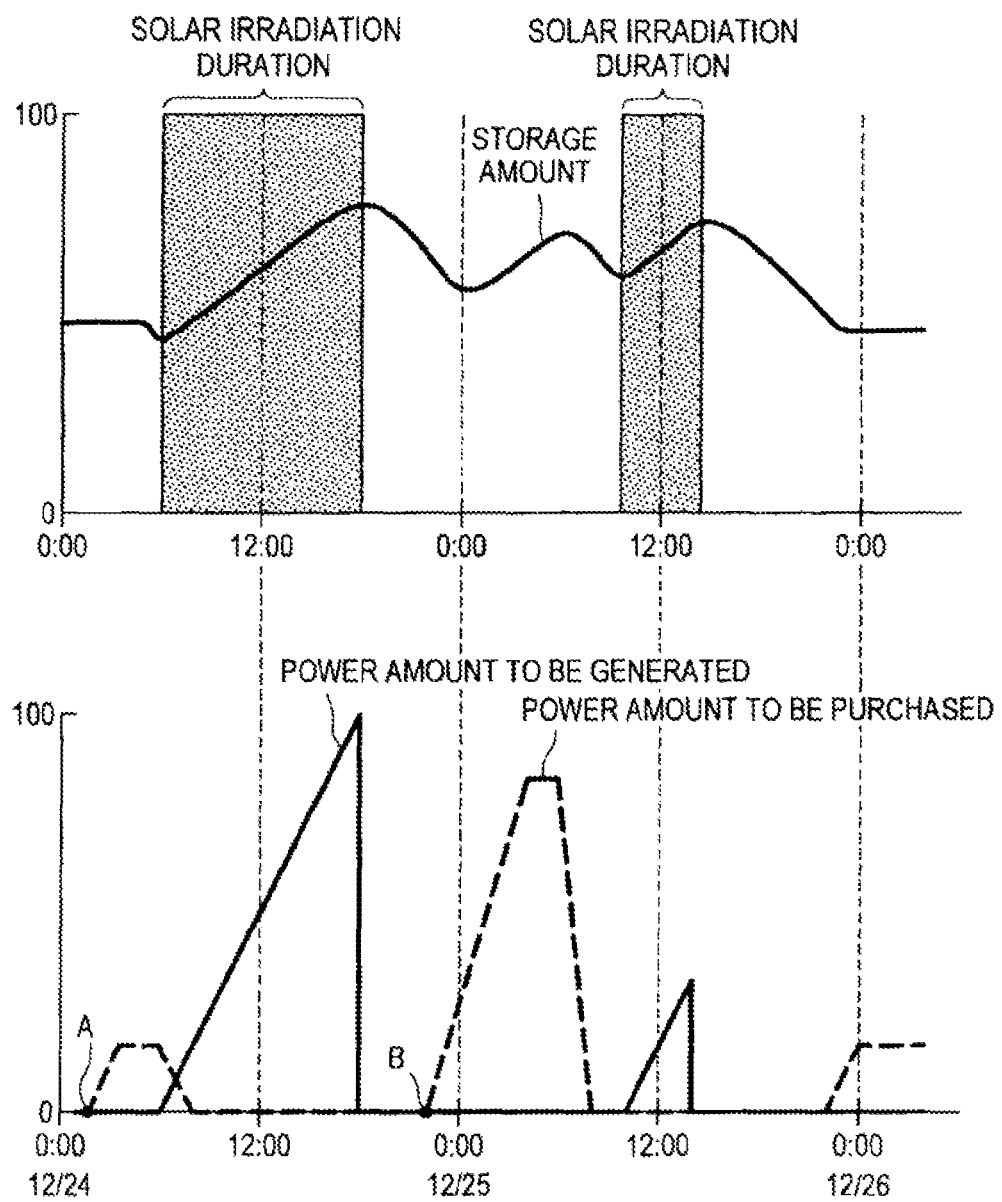
FIG. 4 is an explanatory diagram for specifically explaining the first battery control processing of FIG. 3.

Next, first battery control processing that is performed by the battery control system 1000 in FIG. 1 will be explained. FIG. 3 is a flow chart of the first battery control processing that is performed by the battery control system 1000 in FIG. 1. FIG. 4 is an explanatory diagram for specifically explaining the first battery control processing of FIG. 3. The present processing may be performed after receiving an operation input of a user via the input 112, or may be performed at a predetermined time or at a predetermined time interval.

In FIG. 3, first, the acquisition unit 142 of the control unit 108 acquires storage amount information indicating a current storage amount of the battery 106, via the power distribution unit 110 from the battery 106 (step S302).

Next, the acquisition unit 142 of the control unit 108 acquires via the communication unit 116 sunshine duration estimation information indicating estimated solar irradiation duration, from the storage unit 126 of the server 124 connected to the interne 122 (step S304).

Next, the photovoltaic power generation estimation unit 144 of the control unit 108 estimates a photovoltaic power generation amount of the photovoltaic power generation panel 104, based on the sunshine duration estimation information acquired at the step S304 (step S306).

Next, the power consumption amount estimation unit 146 of the control unit 108 estimates an amount of electric power consumption, based on an operation input of a user via the input unit 112 and information about an amount of electric power consumption in the past, stored in a storage unit (not shown) of the battery control system 1000 (step 308). Besides, at the step S308, when the electric vehicle 138 is used, an amount of electric power consumption is estimated in consideration of an amount of electric power consumption of the electric vehicle 138.

Next, the determination unit 148 of the control unit 108 determines whether or not an amount of electric power to be stored to the battery 106 should be increased, by comparing an amount that is obtained by adding the storage amount indicated by storage amount information of the battery 106, acquired at the step S302, and the photovoltaic power generation amount of the photovoltaic power generation panel 104, estimated at the step S306, with the amount of electric power consumption estimated at the step S308 (step S310).

When it is determined, as a result of determination at the step S310, that a amount of electric power to be stored in the battery 106 should be increased (at the step S310, YES), the power acquisition unit 150 of the control unit 108 either purchases electric power from the electric power company 128 via the power distribution unit 110 or causes the generator 130 to generate electric power, via the power distribution unit 110 so as to store purchased electric power or generated electric power in the battery 106 (step S312).

Here, an amount of electric power with which the battery 106 is additionally charged varies depending on various kinds of conditions. As an example of this, the battery 106 is to be charged in such a manner that an amount obtained by adding the storage amount of the battery 106 at a certain time point and the photovoltaic power generation amount of the photovoltaic power generation panel 104 on the same day is equal to or more than the amount of electric power consumption on the same day. As a result, when it has exceeded the battery capacity, as a matter of course, upper limit should be set to full capacity of the battery. On the other hand, even if it is determined, as a result of the above determination, that electric power should not be stored, when it is expected that the storage amount will be reduced to 0 in any time zone of daytime because a large number of air conditioners will be actually used during the day due to the heat and so on, it is recommendable to charge the battery 106 in advance with an extra amount of electric power that wound be wanted. Consequently, surplus electric power might be left in the battery at the evening on the same day, but the electric power may be used on or after the following day, causing therefore no problem. In this manner, determination how much electric power is to be stored and so on should be performed in consideration of the battery capacity, the time period (time) during which a determination condition is examined, variation in purchase price of electric power according to the time, or the like. A criterion for determining other than that shown in this example is also absolutely acceptable.

When it is determined, as a result of determination at the step S310, that an amount of electric power to be stored in the battery 106 should not be increased (step S310, NO), or after processing at the step 312 has been performed, the present processing is terminated.

According to the first battery control processing of FIG. 3, when electric power to be stored in the battery 104 is set to be either purchased from an electric power company 128 or generated by the generator 130, for example, in a case where the amount that is obtained by adding the storage amount of the battery 106 and the photovoltaic power generation amount of the photovoltaic power generation panel 104 is fewer than the amount of electric power consumption, a needed amount of electric power will be constantly stored in the battery 106. Thereby, it is possible to efficiently control the battery 106 introduced in the residential building 100 or the like.

Moreover, when the first battery control processing of FIG. 3 is performed at time point A in FIG. 4, namely, after midnight on December 24, the storage amount of the battery 106 is approximately 50 percent as shown in FIG. 4. However, because the estimated photovoltaic power generation amount of the photovoltaic power generation panel 104 is large, an amount of electric power to be purchased is set to be low at the step S312. Further, when the first battery control processing of FIG. 3 is performed at time point B in FIG. 4, namely, before midnight on December 25, the storage amount of the battery 106 is approximately 60 percent as shown in FIG. 4. However, because the estimated photovoltaic power generation amount of the photovoltaic power generation panel 104 is low, an amount of electric power to be purchased is set to be large at the step S312. Moreover, electric power is purchased in FIG. 4, but the identical amount of electric power may be generated, without purchasing electric power.

Besides, in the first battery control processing of FIG. 3, when electric power is purchased from the electric power company 128 at the step S312, it is recommendable to purchase electric power in the time zone during which electric power is cheap with regard to a carbon tax or the like. Further, as a result of the determination at the step S310, when the amount that is obtained by adding the storage amount of the battery 106 and the photovoltaic power generation amount of the photovoltaic power generation panel 104 is equal to or more than the amount of electric power consumption, surplus electric power stored in the battery 106 may be sold to the electric power company 128. However, when selling electric power, it is recommendable to sell electric power in the time zone during which selling price of electric power is high.

Moreover, in the present embodiment, the battery control system 1000 includes the photovoltaic power generation panel 104. However, the battery control system 1000 may include, instead of the photovoltaic power generation panel 104 or in addition to the photovoltaic power generation panel 104, a wind power generator (not shown). If such is the case, at the step S304 in the first battery control processing of FIG. 3, wind speed estimation information is acquired from the storage unit 126 of the server 124, and at the step S306, a wind power generation amount is estimated based on the wind speed estimation information. Further, at the step S310, the amount that is obtained by adding the storage amount of the battery 106 and the photovoltaic power generation amount of the photovoltaic power generation panel 104, and/or, the wind power generation amount of the wind power generator is compared with the amount of electric power consumption. Thereby, it is possible to efficiently control the battery 106 introduced in the residential building 100 or the like, also when a wind generator is provided.

[4. Second Battery Control Processing]

Figure 5:
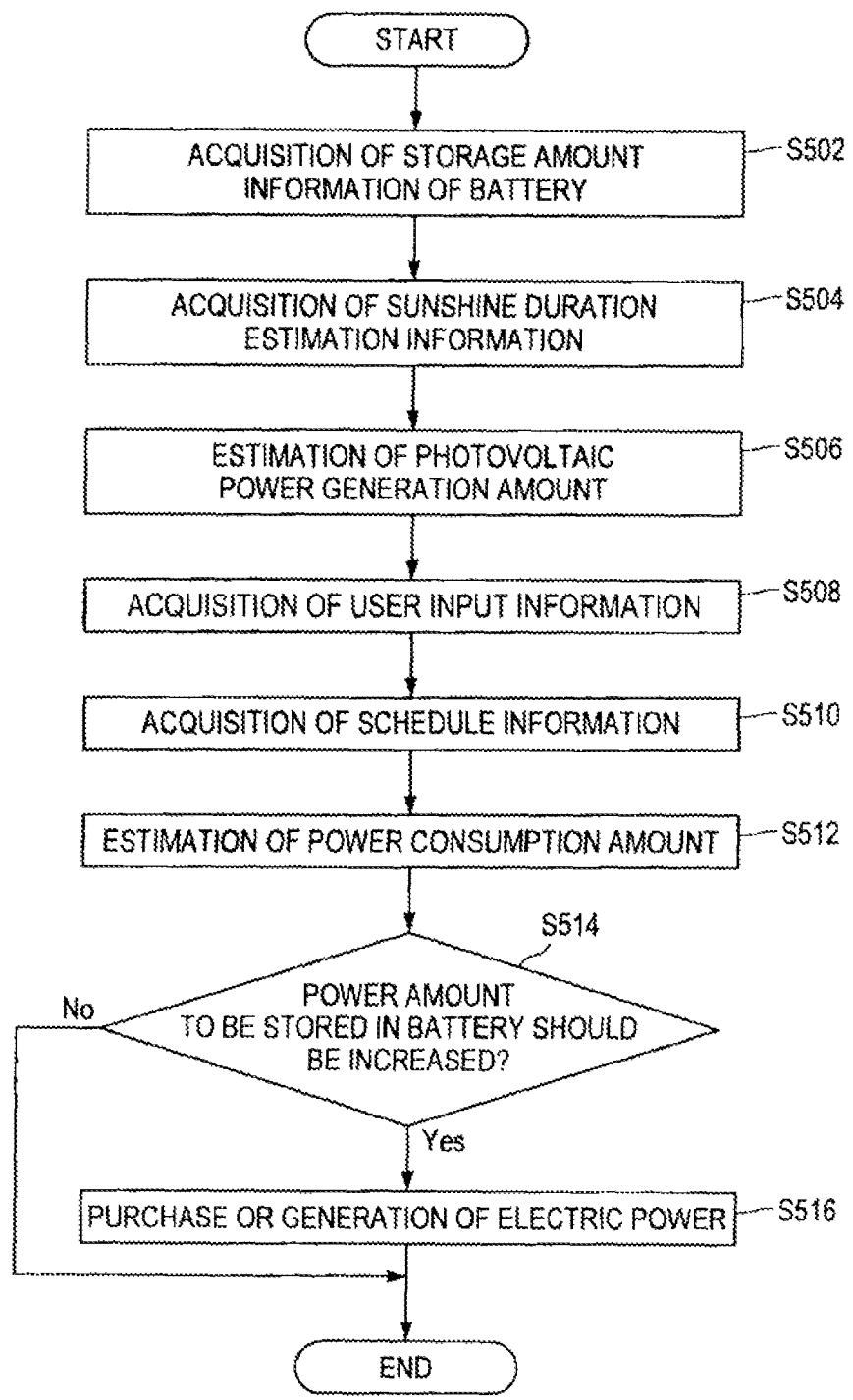
FIG. 5 is a flow chart of second battery control processing that is performed by the battery control system in FIG. 1.
Figure 9:
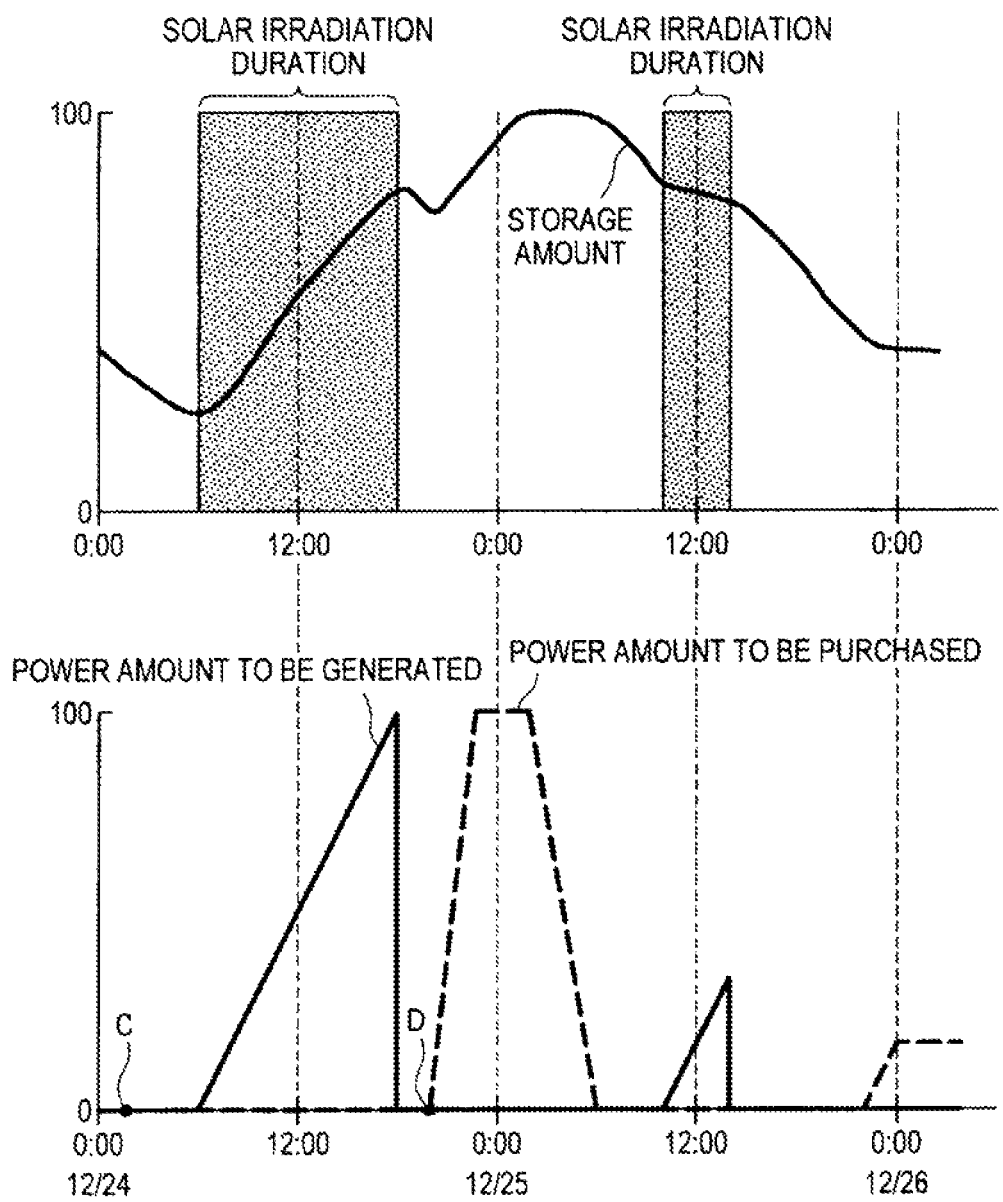
FIG. 9 is an explanatory diagram for specifically explaining the second battery control processing of FIG. 5.

Next, second battery control processing that is performed by the battery control system 1000 in FIG. 1 will be explained. FIG. 5 is a flow chart of the second battery control processing that is performed by the battery control system 1000 in FIG. 1. FIG. 9 is an explanatory diagram for specifically explaining the second battery control processing of FIG. 5. The present processing may be performed after receiving an operation input of a user via the input 112, or may be performed at a predetermined time or at a predetermined time interval.

In FIG. 5, first, the acquisition unit 143 of the control unit 108 acquires storage amount information indicating a current storage amount of the battery 106, via the power distribution unit 110 from the battery 106 (step S502).

Next, the acquisition unit 142 of the control unit 108 acquires via the communication unit 116 sunshine duration estimation information indicating estimated solar irradiation duration, from the storage unit 126 of the server 124 connected to the interne 122 (step S504).

Next, the photovoltaic power generation amount estimation unit 144 of the control unit 108 estimates a photovoltaic power generation amount of the photovoltaic power generation panel 104 during the day, based on the sunshine duration estimation information acquired at the step S504 (step S506).

Figure 6:
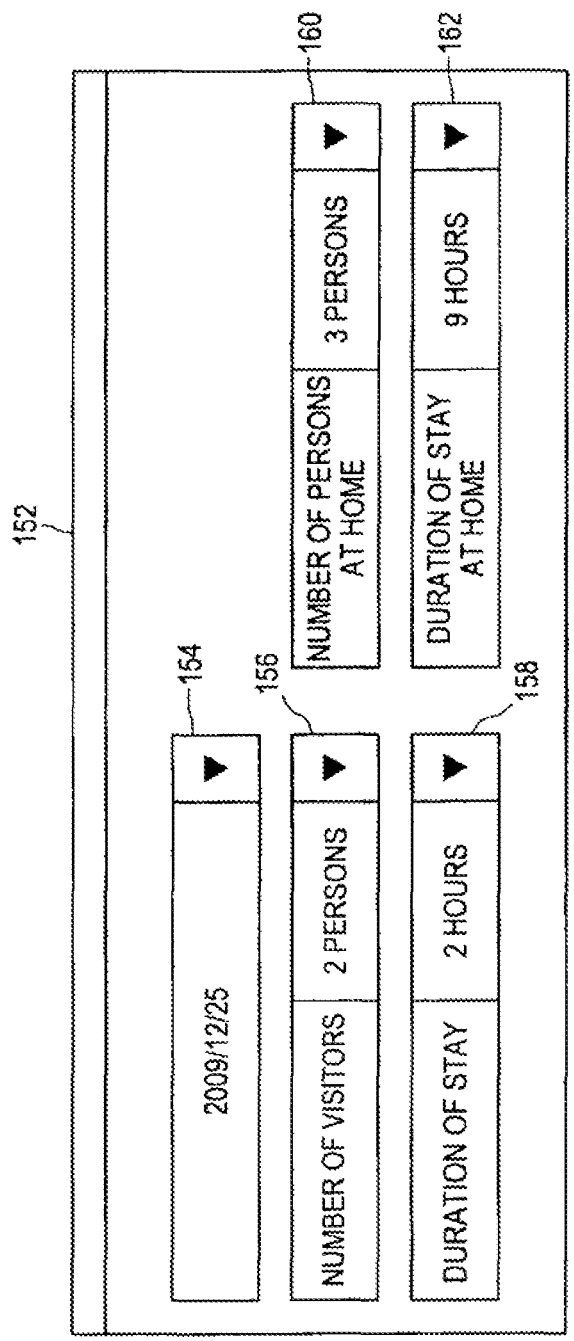
FIG. 6 is an explanatory diagram illustrating an example of an input screen displayed on a display unit in FIG. 1.

Next, the acquisition unit 142 of the control unit 108 acquires user input information generated by an operation input of a user via the input unit 112 (step S508). For example, an input screen 152 as shown in FIG. 6 is displayed on the display unit 114. A user may set via the input unit 112 a date 154, the number of visitors 156, duration of visitor's stay 158, the number of persons at home 160 and duration of stay at home 162 on the input screen 152. Namely, user input information acquired at the step S508 includes, for example, date information, information about the number of visitors, information about duration of visitor's stay, information about the number of persons at home and information about duration of stay at home.

Figure 7:
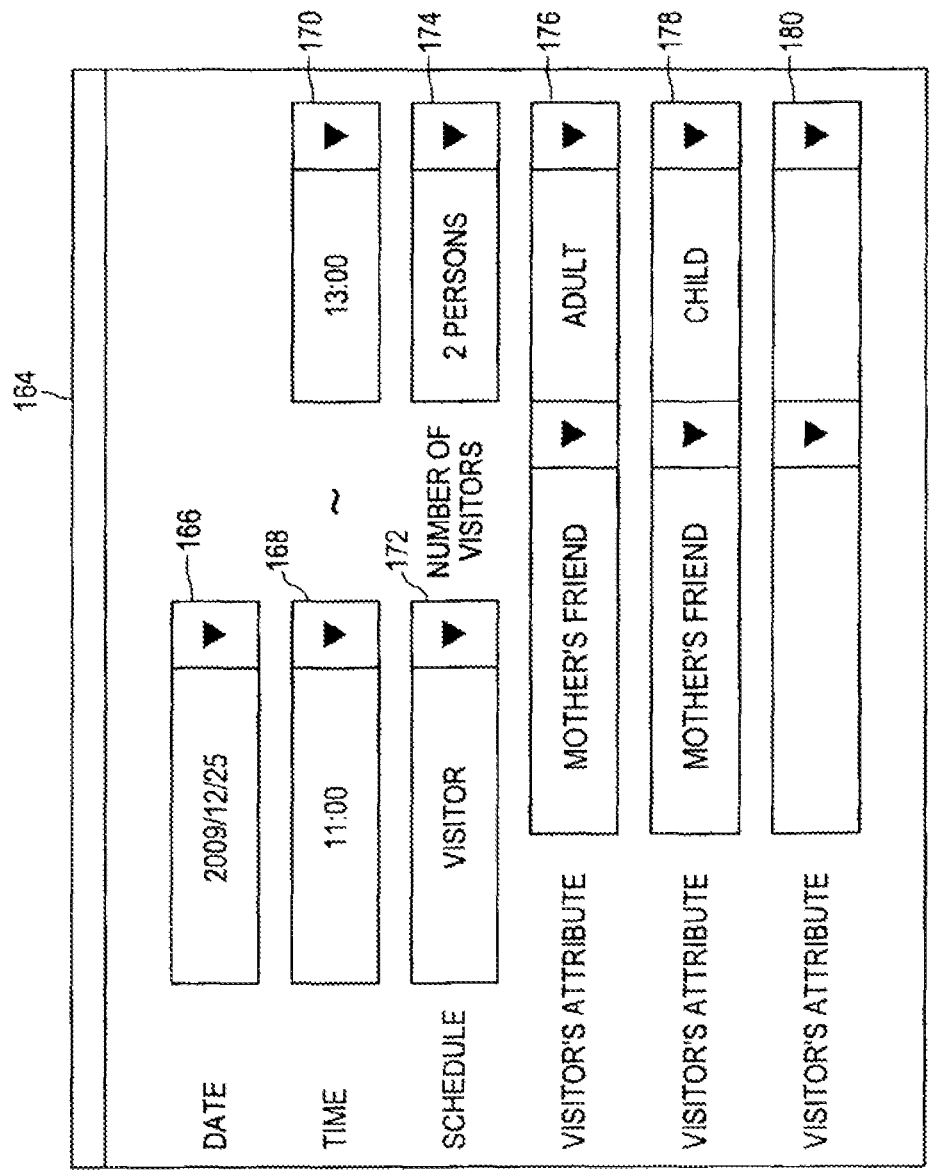
Figure 8:
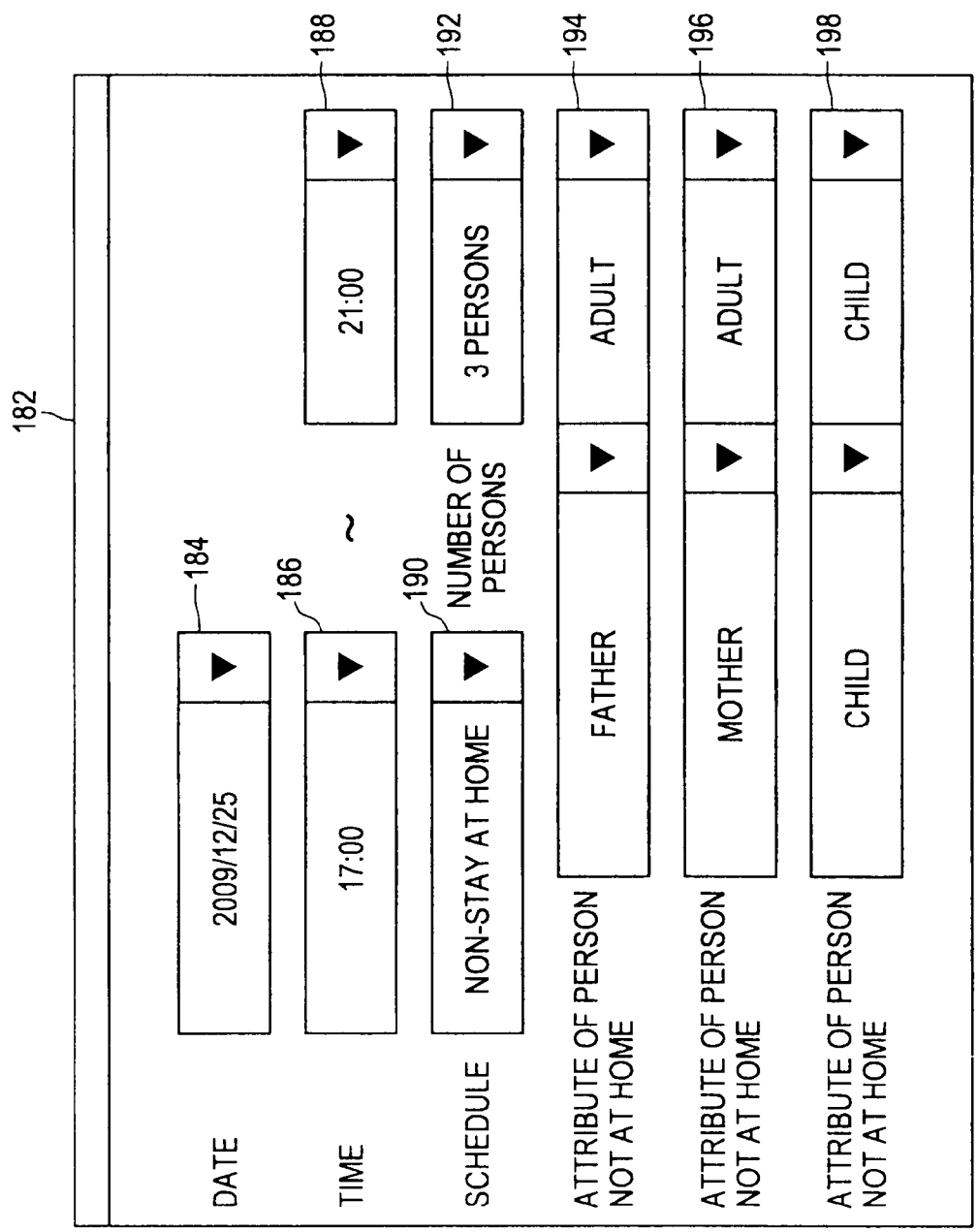

Next, the acquisition unit 142 of the control unit 108 acquires via the communication unit 116 schedule information which was input by a user by use of a PC (Personal Computer), a mobile phone, or the like (not shown), from the storage unit 126 of the server 124 connected to the interne 122 (step S510). For example, an input screens 164 as shown FIG. 7 or an input screen 182 as showed in FIG. 8 is displayed on a display unit (not shown) of a PC, a mobile phone, or the like. A user may set via an input unit (not shown) of a PC, a mobile phone, or the like a date 166, time 168, 170, a schedule 172, the number of visitors 174 and visitor's attributes 176, 178 and 180 on the input screen 164. Also, a user may set via an input unit (not shown) of a PC, a mobile phone, or the like a date 184, time 186, 188, a schedule 190, the number of persons 192 and attributes of persons being not at home 194, 196 and 198 on the input screen 182. Namely, schedule information acquired at the step S510 includes, for example, date information, time information, schedule information, information about the number of visitors and information about a visitor's attribute. Further, schedule information acquired at the step S510 includes, for example, date information, time information, schedule information, information about the number of persons and information about an attribute of a person being not at home. Moreover, at the step S510, schedule information may be acquired from a storage unit (not shown) of the battery control system 1000. If such is the case, the battery control system 1000 serves as a schedule system managed by the server 124 as described above.

Next, the power consumption amount estimation unit 146 of the control unit 108 estimates an amount of electric power consumption, based on user input information acquired at the step 508 and schedule information acquired at the step S510 as well as information about a amount of electric power consumption in the past, stored in a storage unit (not shown) of the battery control system 1000 (step S512). For example, at the step S512, an amount of electric power consumption including an amount of electric power consumption due to a receiving a visitor is estimated, based on information about the number of visitors and information about duration of stay included in user input information. Also, at the step S512, an amount of electric power consumption including an amount of electric power consumption due to stay at home is estimated, based on information about the number of persons at home and information about duration of stay at home included in user input information. Further, at the step S512, an amount of electric power consumption including an amount of electric power consumption due to receiving a visitor is estimated, based on time information, information about the number of visitors and information about a visitor's attribute included in schedule information. Furthermore, at the step S512, an amount of electric power consumption is estimated in which an amount of electric power that will be not consumed due to non-stay at home is deducted, based on time information, information about the number of persons and information about an attribute of a person being not at home included in schedule information. Here, Information about an amount of electric power consumption in the past relates to a variance value of a power amount due to receiving a visitor or due to non-stay at home as described above, or the like. For example, based on the schedule information described above, actual values each indicating to what extent a power amount has varied are accumulated and a variance value of a power amount is calculated from, for example, an average value of accumulated actual values, and so on. Besides, at the step S512, when an electric vehicle 138 is used, an amount of electric power consumption including an amount of electric power consumption of the electric vehicle 138 is estimated.

Next, the determination unit 148 of the control unit 108 determines whether or not an amount of electric power to be stored in the battery 106 should be increased, by comparing the amount that is obtained by adding the storage amount indicated by storage information of the battery 106, acquired at the step S502, and the photovoltaic power generation amount of the photovoltaic power generation panel 104, estimated at the step S506, with the amount of electric power consumption estimated at the step S512 (step S514).

When it is determined, as a result of determination at the step S14, that an amount of electric power to be stored in the battery 106 should be increased (step S514, YES), the power acquisition unit 150 of the control unit 108 either purchases electric power from the electric power company 128 via the power distribution unit 110 or causes the generator 130 to generate electric power, via the power distribution unit 110 so as to store purchased electric power or generated power in the battery 106 (step S516).

When it is determined, as a result of the determination at the step S514, that an amount of electric power to be stored in the battery 106 should not be increased (step S514, NO), or after the processing at the step S516 has been performed, the present processing is terminated.

According to the second battery control processing of FIG. 5, when electric power to be stored in the battery 104 is set to be either purchased from an electric power company 128 or generated by the generator 130, for example, in a case where the amount that is obtained by the storage amount of the battery 106 and the photovoltaic power generation amount of the photovoltaic power generation panel 104 is fewer than the amount of electric power consumption, a needed amount of electric power will be constantly stored in the battery 106. Thereby, it is possible to efficiently control the battery 106 introduced in the residential building 100 or the like.

Further, because an amount of electric power consumption is estimated based on use input information and schedule information, it is possible to perform more accurate estimation of an amount of electric power consumption in contrast to the first battery control processing described above.

Besides, when the second battery control processing is performed at time point C in FIG. 5, namely, after midnight on December 24, the storage amount of the battery 106 is approximately 30 percent as shown in FIG. 9. However, when the estimated photovoltaic power generation amount of the photovoltaic power generation panel 104 is large and a user has also set a schedule to leave home on December 24, an estimated amount of electric power consumption decreases, so that electric power is not purchased at the step S516.

Further, when the second battery control processing is performed at time point D in FIG. 5, namely, before midnight on December 25, the storage amount of the battery 106 is approximately 70 percent as shown in FIG. 9. However, when the estimated photovoltaic power generation amount of the photovoltaic power generation panel 104 is low and a user has also set a schedule to receive a visitor on December 25, an estimated amount of electric power consumption increases, so that an amount of electric power to be purchased is set to be large at the step S516. Moreover, electric power is purchased in FIG. 9, but the identical amount of electric power may be generated, without purchasing electric power.

Besides, in the second battery control processing of FIG. 5, when electric power is purchased from the electric power company 128 at the step S516, it is recommendable to purchase electric power in the time zone during which electric power is cheap with regard to a carbon tax or the like. Further, as a result of determination at the step S514, when the amount that is obtained by adding the storage amount of the battery 106 and the photovoltaic power generation amount of the photovoltaic power generation panel 104 is equal to or more than the amount of electric power consumption, surplus electric power stored in the battery 106 may be sold to the electric power company 128. However, when selling electric power, it is recommendable to sell electric power in the time zone during which selling price of electric power is high.

Moreover, in the present embodiment, the battery control system 1000 includes the photovoltaic power generation panel 104. However, the battery control system 1000 may include, instead of the photovoltaic power generation panel 104 or in addition to the photovoltaic power generation panel 104, a wind power generator (not shown). If such is the case, at the step S504 in the second battery control processing of FIG. 5, wind speed estimation information is acquired from the storage unit 126 of the server 124, and at the step S506, a wind power generation amount is estimated based on the wind speed estimation information. Further, at the step S514, the amount that is obtained by adding the storage amount of the battery 106 and the photovoltaic power generation amount of the photovoltaic power generation panel 104, and/or, the wind power generation amount of the wind power generator is compared with the amount of electric power consumption. Thereby, it is possible to efficiently control the battery 106 introduced in the residential building 100 or the like, also when a wind generator is provided.

Moreover, embodiments of the present invention may be also implemented by providing a system or a device with a recoding medium storing program codes of software that realizes functions of the above embodiments and by causing the computer (or CPU, MPU, or the like) of the system or the device to read out and to execute the program codes stored in the recoding medium.

In this case, the program codes itself, which is read out from the recoding medium, realize functions of the above embodiments, and the program codes and the recoding medium storing the program codes constitute the present invention.

Further, as a recoding medium for providing program codes, for example, a floppy disk (registered trademark), a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, a ROM, or the like may be used. Alternatively, program codes may be downloaded via a network.

Furthermore, functions of the above embodiments may be realized not only by executing program codes read out by a computer, but also by causing, based on instructions of such program codes, an operating system (OS) running on the computer to perform a part or whole parts of actual processing.

Moreover, functions of the above embodiments may be realized, after program codes read out from a recoding medium are written into a memory which is provided on an extension board inserted into a computer or which is provided in an extension unit connected to a computer, by causing, based on instructions of such program codes, a CPU or the like provided on the extension board or in the extension unit to perform a part or whole parts of actual processing.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-279820 filed in the Japan Patent Office on Dec. 9, 2009, the entire content of which is hereby incorporated by reference.

What is claimed is:

1. A battery control system comprising:
a power generation unit that generates electric power from renewable energy as an energy source;
a battery for storing the electric power;
a power generation amount estimation unit that estimates a generation amount of electric power generated by the power generation unit, based on estimation information in which a renewable energy amount available to the power generation unit is estimated;
a power consumption amount estimation unit that estimates an amount of electric power consumption to be consumed based on information input by a user corresponding to the amount of electric power consumption to be consumed and based on a variance value calculated from previously accumulated actual measured electric power consumption values corresponding to the information input by the user;
a determination unit that determines whether or not electric power is to be stored in the battery, based on a storage amount of the battery, the generation amount of electric power and the amount of power consumption; and
a power acquisition unit that acquires electric power to be stored in the battery, when, as a result of determination by the determination unit, electric power is to be stored in the battery.

2. The battery control system according to claim 1, further comprising:
a communication unit;
a storage amount information acquisition unit that acquires storage amount information of the battery from the battery; and
an estimation information acquisition unit that acquires the estimation information from a server via the communication unit.

3. The battery control system according to claim 1, wherein the variance value is calculated from an average value of the accumulated actual measured electric power consumption values.

4. The battery control system according to claim 1, wherein the power consumption amount estimation unit estimates an amount of electric power consumption in a building, and the information input by a user corresponding to the amount of electric power consumption to be consumed includes schedule information including attributes of a visitor to the building.

5. The battery control system according to claim 1, wherein the power acquisition unit purchases electric power to be stored in the battery.

6. The battery control system according to claim 1, wherein the power acquisition unit generates electric power to be stored in the battery by a generator.

7. The battery control system according to claim 1, wherein the power generation unit generates electric power from sunlight energy as an energy source.

8. The battery control system according to claim 1, wherein the power generation unit generates electric power from wind power as an energy source.

9. The battery control system according to claim 1, wherein the battery is a battery mounted on an electric vehicle.

10. A battery controller comprising:
a power generation amount estimation unit that estimates a generation amount of electric power generated by a power generation unit, based on estimation information in which an available renewable energy amount is estimated;
a power consumption amount estimation unit that estimates an amount of electric power consumption to be consumed based on information input by a user corresponding to the amount of electric power consumption to be consumed and based on a variance value calculated from previously accumulated actual measured electric power consumption values corresponding to the information input by the user;
a determination unit that determines, based on a storage amount of a battery for storing the electric power, the generation amount of electric power and the amount of electric power consumption, whether or not electric power is to be stored in the battery; and
a power acquisition unit that acquires electric power to be stored in the battery, when, as a result of determination by the determination unit, electric power is to be stored in the battery.

11. A battery control method, comprising the steps of:
estimating a generation amount of electric power generated by a power generation unit, based on estimation information in which an available renewable energy amount is estimated;
estimating an amount of electric power consumption to be consumed based on information input by a user corresponding to the amount of electric power consumption to be consumed and based on a variance value calculated from previously accumulated actual measured electric power consumption values corresponding to the information input by the user;
determining whether or not electric power is to be stored in a battery, based on a storage amount of the battery, the generation amount of electric power and the amount of electric power consumption; and
acquiring electric power to be stored in the battery, when, as a result of determination at the step of determining, electric power is to be stored in the battery.

12. A non-transitory computer-readable recording medium having a program stored therein, which when executed by a computer, causes the computer to function as:
a power generation amount estimation unit that estimates a generation amount of electric power generated by a power generation unit, based on estimation information in which an available renewable energy amount is estimated;
a power consumption amount estimation unit that estimates an amount of electric power consumption to be consumed based on information input by a user corresponding to the amount of electric power consumption to be consumed and based on a variance value calculated from previously accumulated actual measured electric consumption values corresponding to the information input by the user;
a determination unit that determines, based on a storage amount of a battery for storing the electric power, the generation amount of electric power and the amount of electric power consumption, whether or not electric power is to be stored in the battery; and
a power acquisition unit that acquires electric power to be stored in the battery, when, as a result of determination by the determination unit, electric power is to be stored in the battery.

13. A battery control system comprising:
a power generation unit that generates electric power from renewable energy as an energy source;
a battery for storing the electric power;
an acquisition unit that acquires information about a generation amount of electric power generated by the power generation unit, the generation amount of electric power being estimated based on estimation information in which a renewable energy amount available to the power generation unit is estimated;
a power consumption amount estimation unit that estimates an amount of electric power consumption to be consumed based on information input by a user corresponding to the amount electric power consumption to be consumed and based on a variance value calculated from previously accumulated actual measured electric power consumption values corresponding to the information input by the user;
a determination unit that determines, based on a storage amount of the battery, the information about a generation amount of electric power, and the amount of electric power consumption, whether or not electric power is to be stored in the battery; and
a power acquisition unit that acquires electric power to be stored in the battery, when, as a result of determination by the determination unit, electric power is to be stored in the battery.

14. A battery controller comprising:
an acquisition unit that acquires information about a generation amount of electric power generated by a power generation unit, the generation amount of electric power being estimated based on estimation information in which an available renewable energy amount is estimated;
a power consumption amount estimation unit that estimates an amount of electric power consumption to be consumed based on information in by a user corresponding to the amount of electric power consumption to be consumed and based on a variance value calculated from previously accumulated actual measured electric power consumption values corresponding to the information input by the user;
a determination unit that determines, based on a storage amount of a battery for storing the electric power, the information about a generation amount of electric power, and the amount of electric power consumption, whether or not electric power is to be stored in the battery; and
a power acquisition unit that acquires electric power to be stored in the battery, when, as a result of determination by the determination unit, electric power is to be stored in the battery.

15. A battery control method, comprising the steps of:
acquiring information about a generation amount of electric power generated by a power generation unit, the generation amount of electric power being estimated based on estimation information in which an available renewable energy amount is estimated;
estimating an amount of electric power consumption to be consumed based on information input by a user corresponding to the amount of electric power consumption to be consumed and based on a variance value calculated from previously accumulated actual measured electric power consumption values corresponding to the information input by the user;
determining, based on a storage amount of a battery, the information about a generation amount of electric power, and the amount of electric power consumption, whether or not electric power is to be stored in the battery; and
acquiring electric power to be stored in the battery, when, as a result of determination by the determination unit, electric power is to be stored in the battery.

16. A non-transitory computer-readable recording medium having a program stored therein, which when executed by a computer, causes the computer to function as:
an acquisition unit that acquires information about a generation amount of electric power generated by a power generation unit, the generation amount of electric power being estimated based on estimation information in which an available renewable energy amount estimated;
a power consumption amount estimation unit that estimates an amount of electric power consumption to be consumed based on information input by a user corresponding to the amount of electric power consumption to be consumed and based on a variance value calculated from previously accumulated actual measured electric power consumption values corresponding to the information input by the user;
a determination unit that determines, based on a storage amount of a battery for storing the electric power, the information about a generation amount of electric power, and the amount of electric power consumption, whether or not electric power is to be stored in the battery; and
a power acquisition unit that acquires electric power to be stored in the battery, when, as a result of determination by the determination unit, electric power is to be stored in the battery.

\* \* \* \* \*